United States Patent
Bolognia et al.

[19]

[11] Patent Number: 5,906,276

[45] Date of Patent: May 25, 1999

[54] STORAGE TRAY FOR HOLDING DISC SHAPED ELEMENTS

[75] Inventors: David Bolognia, Lanesboro; George Rufo, Jr., Dalton, both of Mass.

[73] Assignee: Lakewood Industries, Inc., Pittsfield, Mass.

[21] Appl. No.: 09/098,932

[22] Filed: Jun. 17, 1998

Related U.S. Application Data

[63] Continuation-in-part of application No. 08/813,372, Mar. 7, 1997, abandoned, which is a continuation-in-part of application No. 08/746,241, Nov. 7, 1996, abandoned.

[51] Int. Cl.⁶ .................................................. B65D 85/57
[52] U.S. Cl. ........................................ 206/308.1; 206/310
[58] Field of Search ............................... 206/308.1, 309, 206/310, 311, 312, 313, 232

[56] References Cited

U.S. PATENT DOCUMENTS

| | | | |
|---|---|---|---|
| 5,322,162 | 6/1994 | Melk | 206/310 |
| 5,417,324 | 5/1995 | Joyce | 206/310 |
| 5,494,156 | 2/1996 | Nies | 206/310 |
| 5,515,968 | 5/1996 | Taniyama | 206/310 |
| 5,526,926 | 6/1996 | Deja | 206/310 |
| 5,660,274 | 8/1997 | Chien | 206/310 |

*Primary Examiner*—Jacob K. Ackun
*Attorney, Agent, or Firm*—Cain, Hibbard, Myers & Cook, PC; William F. Mufatti

[57] ABSTRACT

A storage tray for compact discs (CD's) having a central opening consisting of a flat panel base with a plurality of raised cantilever members (fingers), the plurality of raised fingers being referred to as a rosette. The ends of the fingers form a circular opening and are unattached at the end. The fingers have on the underside thereof, a reinforcing rib. Some or all of the fingers may have the reinforcing rib. The fingers with the rib still have sufficient flexibility to move slightly inward and outward when positioning a CD over the rosette.

11 Claims, 3 Drawing Sheets

STORAGE TRAY FOR HOLDING DISC SHAPED ELEMENTS

FIELD OF THE INVENTION

This invention is a continuation-in-part of U.S. patent application filed Mar. 7, 1997, Ser. No. 08/813,372, Attorney Docket LII-009 entitled *An Improved Storage Tray For Holding Disc Shaped Elements,* now abandoned, which was a continuation-in-part of U.S. patent application filed Nov. 7, 1996, Ser. No. 08/746,241, Attorney Docket LII-006 entitled *An Improved Storage Tray For Holding Disc Shaped Elements,* now abandoned.

The present invention relates to a storage container for holding a disc shaped element having electronically stored recordings thereon and having a cylindrical opening in the center of the disc shaped element. The storage containers for these discs are commonly referred to as "jewel boxes", and the disc shaped elements are commonly referred to as compact discs or just "CD's". The storage container has as a component thereof a tray on which the disc shaped element is seated. More specifically, this invention is directed to the storage tray for storing and securing a CD in place, wherein the tray has an improved centrally located circular arrangement of particularly designed raised cantilever members in an angular array generally disposed around and emanating from a raised seat or circular surface with the upper part of the cantilever member extending inwardly. The raised cantilever members are often referred to as a "rosette" and the cantilever members themselves are referred to as "fingers". The central opening of the disc shaped element is secured over the circular raised cantilever or rosette. On most rosettes, the members or fingers are generally flexible in that they can move inwardly under slight pressure such as positioning the disc shaped element over the cantilever members and upon release of the pressure the cantilever members spring back or outwardly and secure the disc shaped element seated on the circular raised surface. The circular cantilever members engage and secure the disc shaped element in place during storage. The instant invention is directed to the cantilever members or fingers wherein some of the fingers are substantially rigid relative to the remaining fingers which are flexible and primarily secure the CD in place on the storage tray and which are rigidified with a rib on the underside of the cantilever member or members (hereinafter fingers).

BACKGROUND OF THE INVENTION

Storage containers for holding one or more disc shaped elements having electronically stored recordings thereon (hereinafter referred to as CD) are well known particularly in the entertainment field and in the information storage field. These storage containers for CD's are so designed to hold one or more such CD's. In fact, one container arrangement or jewel box has an insertable tray such that a single CD jewel box can be converted into a two CD jewel box by employing an insertable tray (U.S. Pat. No. 5,284,243) without essentially changing the dimensions of the jewel box.

The trays are employed in CD containers used to support and secure CD's and are generally made from pigmented thermoplastic molding resins having a varying degree of impact resistance. As such, the tray particularly the circular cantilever member arrangement (hereinafter referred to as a "rosette") around which the CD is seated is able to withstand loading forces or impact during assembly, CD loading operations, shipping and handling by the ultimate consumer or user of the CD.

However, there is a growing demand today for greater graphic display in CD containers. Artists are requiring a clear see through tray or CD holder so that a larger percentage of graphic area is visible to the consumer. By this it is meant that more graphics with respect to the artist and/or entertainment contained on the CD is viewable by the prospective buyer, the user or ultimate consumer. In order to achieve a clear see through disc holder tray, a transparent plastic material must be used. The most economical material available is crystal polystyrene. A functional CD holder tray can be molded, generally by injection molding, from crystal polystyrene using existing molds and designs without requiring substantial changes to the mold or to the jewel box design. However, crystal polystyrene, while inexpensive relative to other transparent plastics, is nevertheless brittle and, as such, the central cantilever members of the rosette have a tendency to fracture and/or break away during loading, shipping and/or handling operations due to the low impact resistance or brittleness of the crystal polystyrene. This can result in the CD becoming somewhat moveable in the jewel box and as it moves about, the CD can be damaged impairing the recording media stored thereon. The fractured cantilever members can also move around in the container and damage the surface of the CD by scratching the surface. This also impairs the stored recording media thereon.

U.S. Pat. No. 5,417,324 discloses one method of reinforcing the cantilever members of the rosette of a CD storage tray. The invention of the U.S. Pat. No. 5,417,324 employs a rib interconnecting at least two opposite cantilever members or fingers.

U.S. Pat. No. 5,494,156 discloses reinforced members and posts forming the rosette and thereby increasing the impact resistance of the rosette.

However, none of the references disclose reinforcing the fingers of a rosette by molding a rib on the underside of the fingers.

SUMMARY OF THE INVENTION

This invention is a continuation-in-part of the pending application identified previously herein and this invention is directed to an improved storage tray for storing and securing CD's wherein the storage tray has a particular rigidified central circular cantilever members (fingers). More particularly, the improvement is in the central circular finger arrangement, i.e., the rosette. The CD is seated around the rosette and secured in place by the fingers and is supported generally on a circular raised surface. A rosette of various configuration is generally employed in virtually all containers for storing and securing CD's on a storage tray. Such CD's are circular in shape, generally have electronically stored recording on the surface thereof by a variety of means, and have a centrally located circular opening or, simply, a hole in the center thereof. The central opening provides the convenience for setting the CD on a spindle of a playback device. Today, CD's are commonly known in the entertainment field, particularly for musical recordings. However, compact discs (CD's) come in a variety of different sizes (including micro discs) and may be used to digitally record sound (audio-CD's), images (photo CD's), data (CD-ROMs), combinations thereof and the like, including the newly developed video CD's.

The centrally located opening in the CD also allows for seating the CD around the rosette which stores and secures the CD onto the tray. The rosette of this invention consists of raised cantilever members (fingers) and are flexible so that they can move inwardly under a slight pressure and can spring back without breaking when the pressure is released wherein some or all of the fingers have rib means molded on the underside thereof. The CD is placed over the fingers and pushed onto the bottom of the tray or, preferably, on a raised circular surface from which the fingers generally emanate upward.

The CD is generally supported by a raised circular surface or seat as described above so that the CD avoids contact with the bottom part of the tray and is secured in place by the finders of the rosette. The CD may also be peripherally supported at the outer edges of the CD upon which there is generally no recording so as to further enhance support of the CD with further insurance of avoiding contact of the surface of the CD with either the base of the tray carrying the CD or the cover of the storage container. However, when employing clear crystal polystyrene or even a clear low impact thermoplastic, it is the fingers of the rosette that fracture or break away and, thus, increase the risk of the surface of the CD being damaged.

The present continuation-in-part invention comprises a novel rosette having engagement means consisting essentially of a plurality of fingers in a circular arrangement wherein some or all of the cantilever members are rigidified by a rib under the fingers but are yet sufficiently flexible to move in order to hold and secure a CD in place. The outer edge of the fingers at the base of the rosette may also have touching or pressure contact with the inner periphery of the central opening in a CD.

Therefore, it is an object of the present invention to provide a CD tray having a plurality of raised finger engagement means around which a CD is seated and secured and which engagement means are resistant to fracture during loading of a CD onto the storage tray and transporting the storage container with the CD.

Another object of this invention is to provide a rosette engagement with at least some of the fingers of the rosette having rib means molded on the underside of the finger.

Yet, another object of this invention to provide a rosette wherein all of the fingers of the rosette have rib means molded on the underside thereof.

These and other objects of this invention will become apparent from the following description.

DETAILED DESCRIPTION OF THE INVENTION

Figure 1:
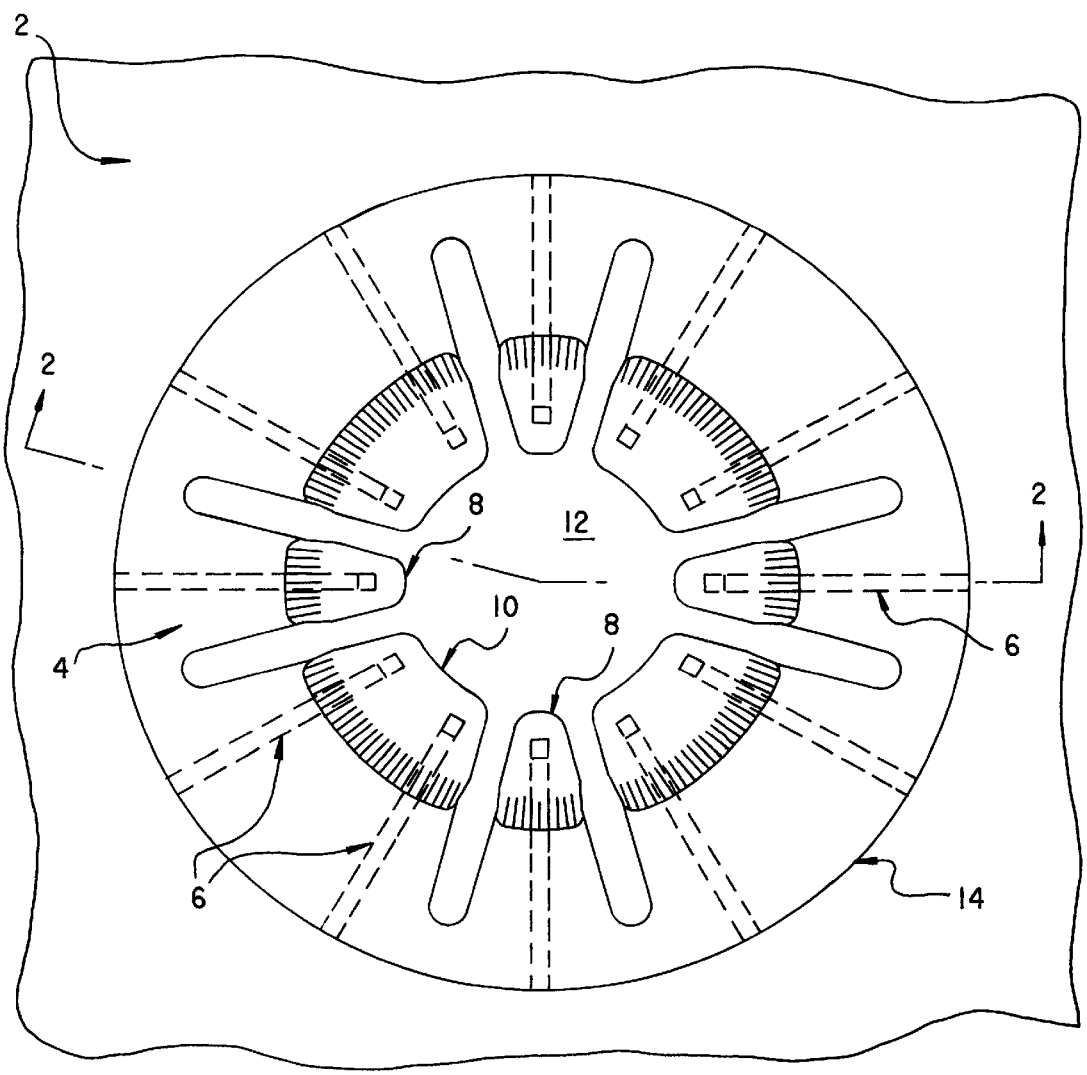
FIG. 1 is a top view of the rosette of one embodiment of this invention.

As stated previously, this invention is directed to a storage tray having improved engagement means for storing and securing CD's. The engagement means of this invention consists essentially of a rosette which may be situated in approximately the center of a storage tray for CD's onto which rosette a CD is seated and stored. In some containers, the storage tray for the CD may be the base of a container for the CD with a rotatable cover thereover, which may be hinged by pins, for example, at one end of the cover and base. Alternatively, the storage tray for the CD may be removably attached to the base of the container. However, in the practice of this invention, the critical feature is in the rosette. It is applicable to whether the container holds one, two or more CD's with one or more CD storage trays, or has a rotatable insertable tray for converting a single CD container into a two or more CD container or whether the container consists of a series of stackable CD storage trays or has a removable CD storage tray. This invention is also applicable to U.S. patent application Ser. No. 08/580,326 filed Dec. 28, 1995, assigned to the same assignee of this invention and which is incorporated herein by reference.

This invention is directed to a storage tray having engagement means for storing and securing a CD in a container or jewel box upon loading of the tray with the CD, shipping and handling of the container. More specifically, this invention is directed to engagement means for storing and securing a CD on a storage tray. The engagement means comprise a centrally located circular finger arrangement consisting of a series of individually raised fingers emanating from the base of the storage tray (planar panel) or, preferably, from a circular raised surface. The finger arrangement of this invention is such that the fingers, some or all, are sufficiently rigidified but yet sufficiently flexible to accept a CD without excessive damage to the inner periphery of the circular opening in the CD. The fingers have a top and bottom side and are rigidified with rib means molded on the bottom or underside of the finger. The reinforcing rib means on the underside of a finger is integrably molded as part of the finger and extends from the base of the finger radially inwardly toward the center of the rosette and does not extend beyond the end of the finger. The rib means lie in a plane vertical to the finger thereby reinforcing the finger at a junction of the vertical raised part of the finger and the upper part of the finger extending inwardly and substantially parallel to the planar base. If only some of the fingers have rib means on the underside thereof, i.e., the side of the fingers opposite the side on which the CD is secured, the fingers not having rib means may have a greater degree of flexibility than those fingers having rib means thereunder.

The ends of the finger are open and extend inwardly forming a circular opening in substantially the center of the rosette. The ends of the fingers are open, i.e., unattached and lie in a plane substantially parallel to the planar base of the storage tray. The fingers are all substantially of the same height. The heights of the ends of all of the members are not intentionally varied such that the height of some are at a greater height than the height of the other fingers of the rosette.

Flexibility is not a measured property such that it can be defined in terms of a number. It is a physical characteristic or property of the fingers relative to each other or relative to the force required to seat the CD over the fingers of the rosette.

In another embodiment of this invention, some of the fingers have a width greater than the other fingers. In this embodiment, the cross-sectional area of the wider fingers would be wider at the base and at the end thereof relative to the width of the base and end of the others fingers or members. Generally, in the rosette of this embodiment, there are at least two (2) such wider fingers and preferably at least four (4) such wider fingers.

The top view of this embodiment is shown in FIG. 1. The wider members or finger may have a width preferably about 1½ to about 2½ times the width of the other members.

As stated, the critical feature of this invention is the molding of rib means on the underside of the fingers. As shown in the drawing, all of the fingers have rib means on the underside thereof. However, only some of the fingers need have rib means on the underside thereof, particularly those fingers having a width less than the wider fingers. The rib means on the underside of the fingers may be any width and/or thickness but should be of sufficient width and thickness to provide rigidity to the fingers but yet maintain flexibility to allow a CD to be seated over the fingers of the rosette without causing excessive damage to the inner periphery of the circular opening in a CD. Preferably, the thickness of the rib means is at least about 0.05 inches and the width is at least about 0.025 inches. More particularly, the rib means is about 0.05 to about 0.100 inches wide and preferably about 0.020 to about 0.050 inches wide and more particularly about 0.025 to about 0.100 inches thick.

Figure 3:
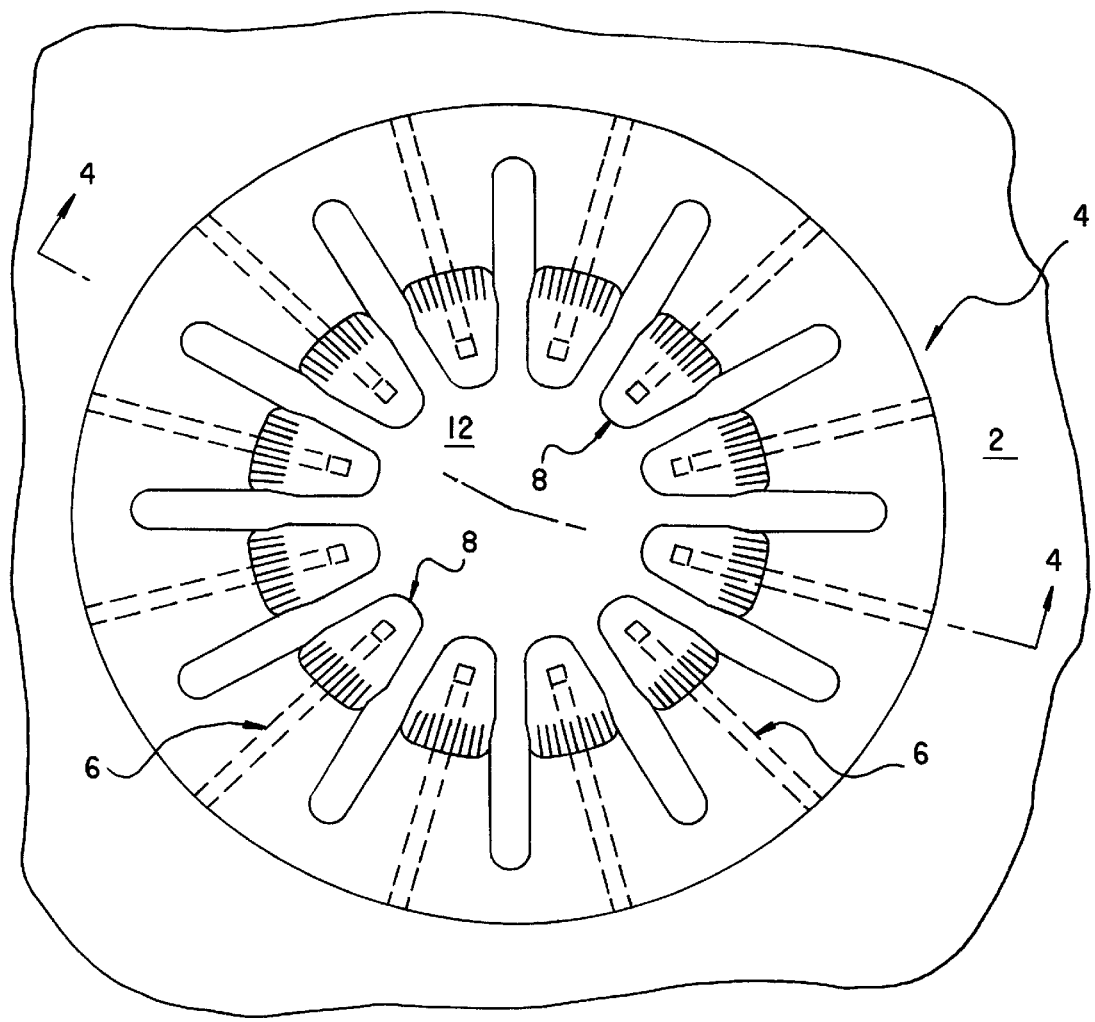
FIG. 3 is a top view of another embodiment of this invention.

In another embodiment, all of the fingers are essentially the same width and thickness, i.e., normal width and thickness as shown on FIG. 3. Again, in such an arrangement, all or only some of the fingers have rib means molded on the underside of the fingers. Preferably, in this embodiment, all of the fingers have rib means molded on the underside thereof.

While the improvement of this invention is primarily employed when molding brittle or low to moderate impact resistant clear thermoplastic resins, it is applicable to any moldable thermoplastic resin whether the thermoplastic resin is clear, translucent or opaque, pigmented, tinted or otherwise, or a low, medium or high impact thermoplastic resin. However, with medium or high impact polymers, impact resistance of the cantilever members may not be as critical a problem since the cantilever members are resilient and resistant to breakage. On the other hand, rigidity of two or more cantilever members may be wanted for reasons other than as set forth herein and, thus, this invention lends itself to such applications. This invention is particularly advantageous to moldable crystal polystyrene and other styrenes polymers such as copolymers and terepolymers containing styrene copolymerizeable with other monomers and which polymers are brittle when molded into articles.

FIG. 1 is a top view of the rosette of one embodiment of this invention comprising part of planar base 2 of the storage tray, rosette 4, reinforcing rib means 6 on the underside of narrow fingers 8, wider fingers 10 with double rib means 6 on the underside and opening 12 is in the center of rosette 4 and raised seat 14.

Figure 2:
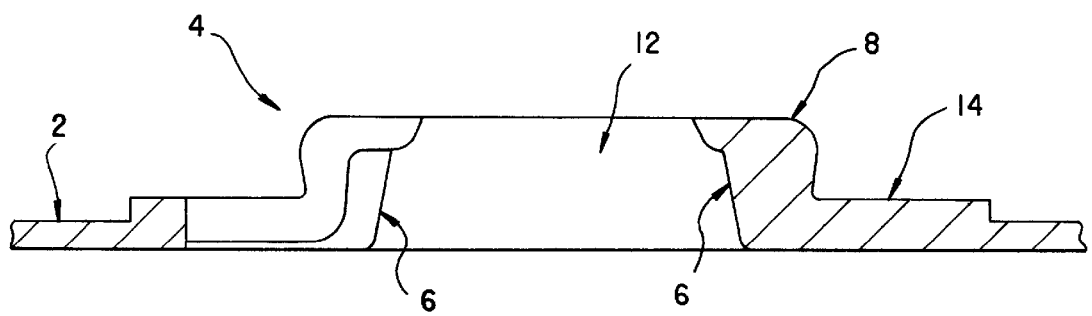
FIG. 2 is a sectional view of FIG. 1 along section line A–A'.

FIG. 2 is a cutaway or sectional view of FIG. 1 along section line A–A' showing rib means 6, narrow finger 8, wider finger 10, raised seat 12, part of planar base 2 of the storage tray and opening 12 in the center of rosette 4.

FIG. 3 is a top view of another embodiment comprising rosette 4 with all narrow fingers 8 and each narrow finger 8 has rib means 6 on the underside, part of base 2 of the storage tray and opening 12 in the center of rosette 4.

Figure 4:
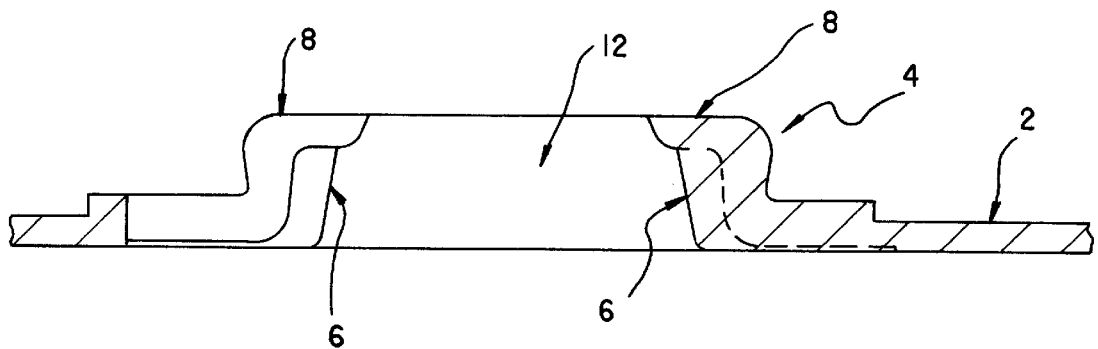
FIG. 4 is a cutaway of FIG. 3 along section B–B'.

FIG. 4 is a cutaway of FIG. 3 along section B–B' showing rosette 4, fingers 8, reinforcing rib means 6, part of base 2 of the storage tray and opening 12 of the rosette 4.

Figure 5:
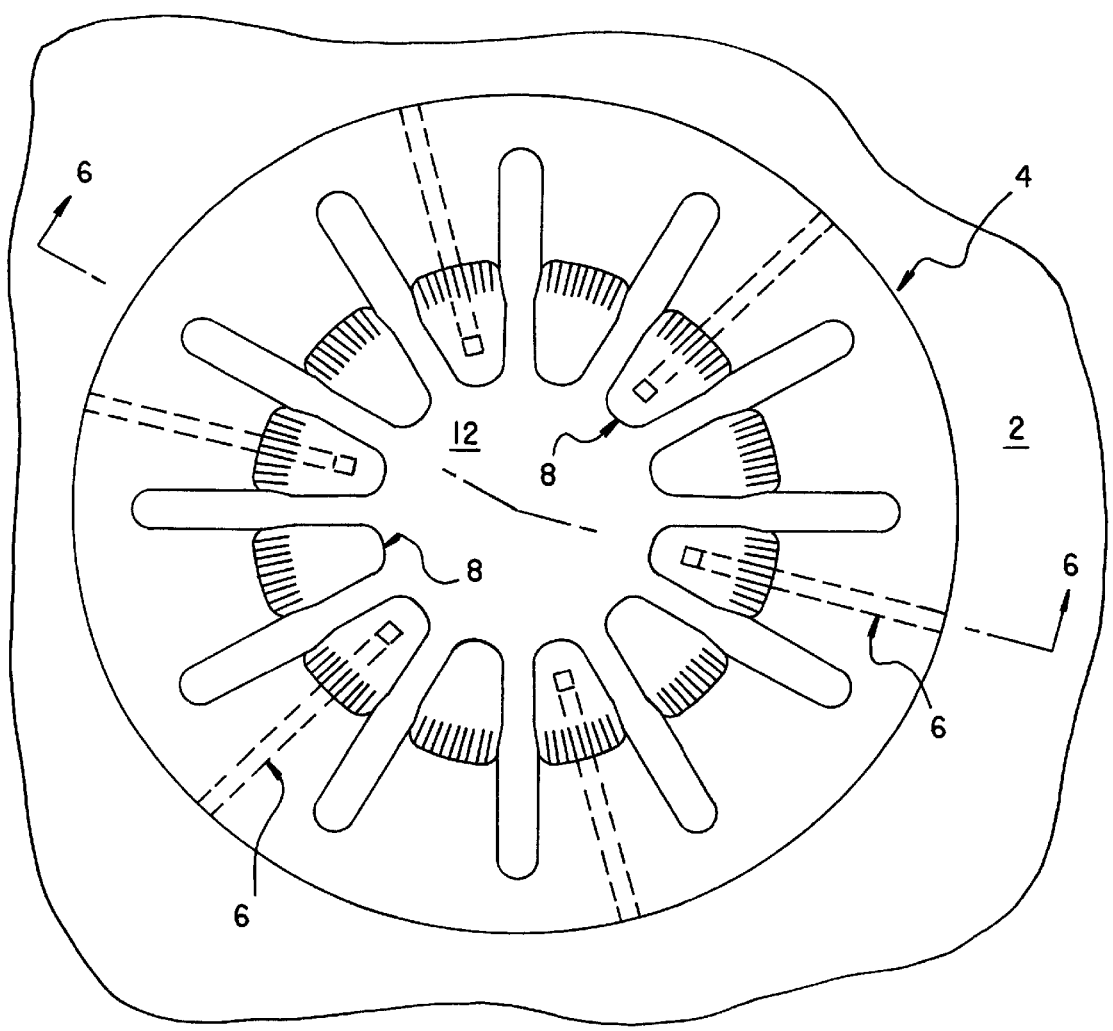
FIG. 5 is a top view of the rosette having rib means on the underside of every other finger.

FIG. 5 is the same as FIG. 4 in all respects except that FIG. 5 is a top view of rosette having all narrow fingers 8 with rib means 6 on the underside of every other finger 8, opening 12 in the center of rosette 4 and part of base 3 of the storage tray.

Figure 6:
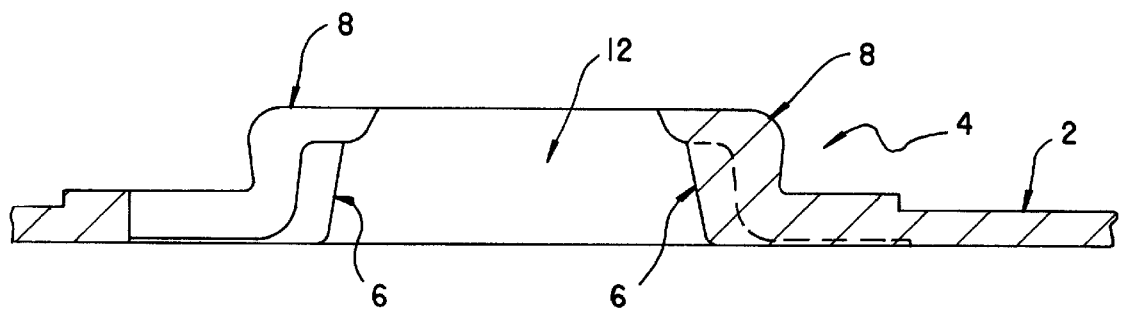
FIG. 6 is a cutaway of FIG. 5 along section C–C'.

FIG. 6 is the same as FIG. 4 in all respects except that FIG. 6 is a cutaway of FIG. 5 along section base C–C' and showing narrow fingers 8 with rib means 6 on the underside of fingers 8, opening 12 in the center of rosette 4 and part of base 2 of the storage tray.

Although the invention has been described by reference to particular illustrative embodiments thereof, many variations and modifications of this invention may become apparent to those skilled in the art without departing from the spirit and scope of this invention as set forth in the appended claims hereto.

What is claimed is:

1. A storage tray for storing and securing disc shaped elements which have a central opening wherein said storage tray has improved impact resistance and comprises a planar panel with engagement means for engaging and securing said disc shaped elements, said engagement means comprising a plurality of raised individual substantially flexible cantilever members all of which emanate from said planar panel, have a top and bottom, and have open ends which open ends are unattached and which form a circular opening wherein at least 2 of said cantilever members have at least one reinforcing rib means on the bottom side which rib means reinforces the cantilever members and extends vertically from said planar panel and do not extend beyond the ends of said cantilever members, the width of said reinforcing rib means is substantially narrower than the width of the cantilever member.

2. The storage tray of claim 1 in which the cantilever members emanate from a circular raised surface in the planar panel.

3. The storage tray of claim 1 in which at least 4 of the cantilever members have rib means on the bottom side of the cantilever member.

4. The storage tray of claim 1 in which all of the cantilever members have rib means on the bottom side of the cantilever members.

5. The storage tray of claim 1 in which at least 2 cantilever members have a width greater than the width of the other cantilever members of the engagement means.

6. The storage tray of claim 1 in which at least 4 cantilever members have a width greater than the other cantilever members of the engagement means.

7. The storage tray of claim 5 in which the at least 2 of the cantilever members having a width greater than the other cantilever members of the engagement means have 2 rib means on the bottom side.

8. The storage tray of claim 6 in which the at least 4 cantilever members have a width of about 1½ to about 2½ times the width of the other cantilever members of the engagement means.

9. The storage tray of claim 1 in which the reinforcing rib means have a thickness of at least about 0.05 inches and a width of at least about 0.025 inches.

10. The storage tray of claim 9 in which the reinforcing rib means have a thickness of about to 0.05 to about 0.100 inches and a width of about 0.025 to about 0.100 inches.

11. The storage tray of claim 6 in which the engagement means consists of 8 cantilever members.

* * * * *